(12) United States Patent
Takagi

(10) Patent No.: US 12,216,012 B2
(45) Date of Patent: Feb. 4, 2025

(54) SENSOR AND POWER TRANSMISSION DEVICE

(71) Applicant: Nidec-Shimpo Corporation, Nagaokakyo (JP)

(72) Inventor: Daisuke Takagi, Nagaokakyo (JP)

(73) Assignee: Nidec-Shimpo Corporation, Kyoto (JP)

( * ) Notice: Subject to any disclaimer, the term of this patent is extended or adjusted under 35 U.S.C. 154(b) by 318 days.

(21) Appl. No.: 17/846,140

(22) Filed: Jun. 22, 2022

(65) Prior Publication Data

US 2022/0412819 A1 Dec. 29, 2022

(30) Foreign Application Priority Data

Jun. 23, 2021 (JP) ................................ 2021-103999

(51) Int. Cl.
 G01L 1/22 (2006.01)
 G01B 7/16 (2006.01)
(52) U.S. Cl.
 CPC .............. G01L 1/2231 (2013.01); G01B 7/18 (2013.01); G01L 1/2287 (2013.01)
(58) Field of Classification Search
 None
 See application file for complete search history.

(56) References Cited

U.S. PATENT DOCUMENTS

| 6,962,088 B2 * | 11/2005 | Horiuchi | ............... F16H 49/001 |
| | | | 73/862.338 |
| 2021/0131893 A1 * | 5/2021 | Takada | .................... G01L 3/108 |

FOREIGN PATENT DOCUMENTS

JP 2004-198400 A 7/2004

* cited by examiner

*Primary Examiner* — Brandi N Hopkins
*Assistant Examiner* — Nigel H Plumb
(74) *Attorney, Agent, or Firm* — Keating & Bennett, LLP

(57) ABSTRACT

A sensor includes a base, and first and second resistance lines. The base extends in a direction intersecting with a central axis. The first resistance lines are arrayed in a circumferential direction on a surface of the base. The second resistance lines are arranged concentrically with the first resistance lines and between the first resistance lines in the circumferential direction on the surface of the base. In the first resistance lines, the number of regions of the resistance line along the circumferential direction is one or less, and the number of regions of the resistance line along a radial direction is one or less. The sensor is able to provide improved detection accuracy.

20 Claims, 12 Drawing Sheets

[Fig. 1]
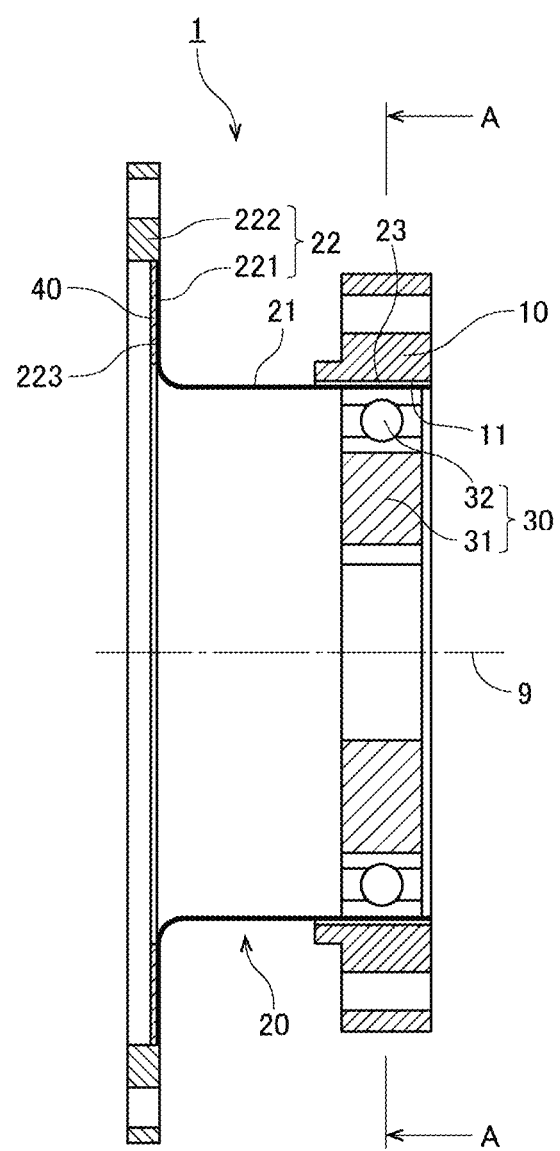

[Fig. 2]
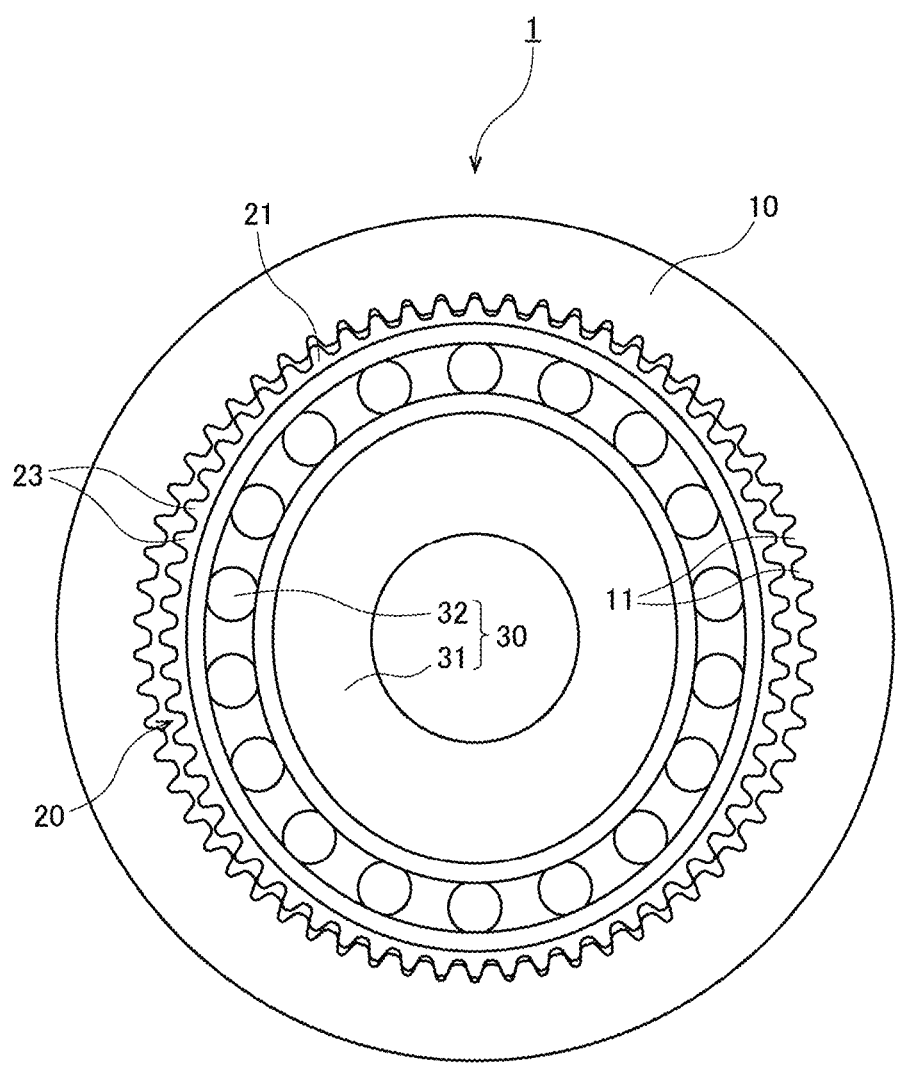

[Fig. 3]
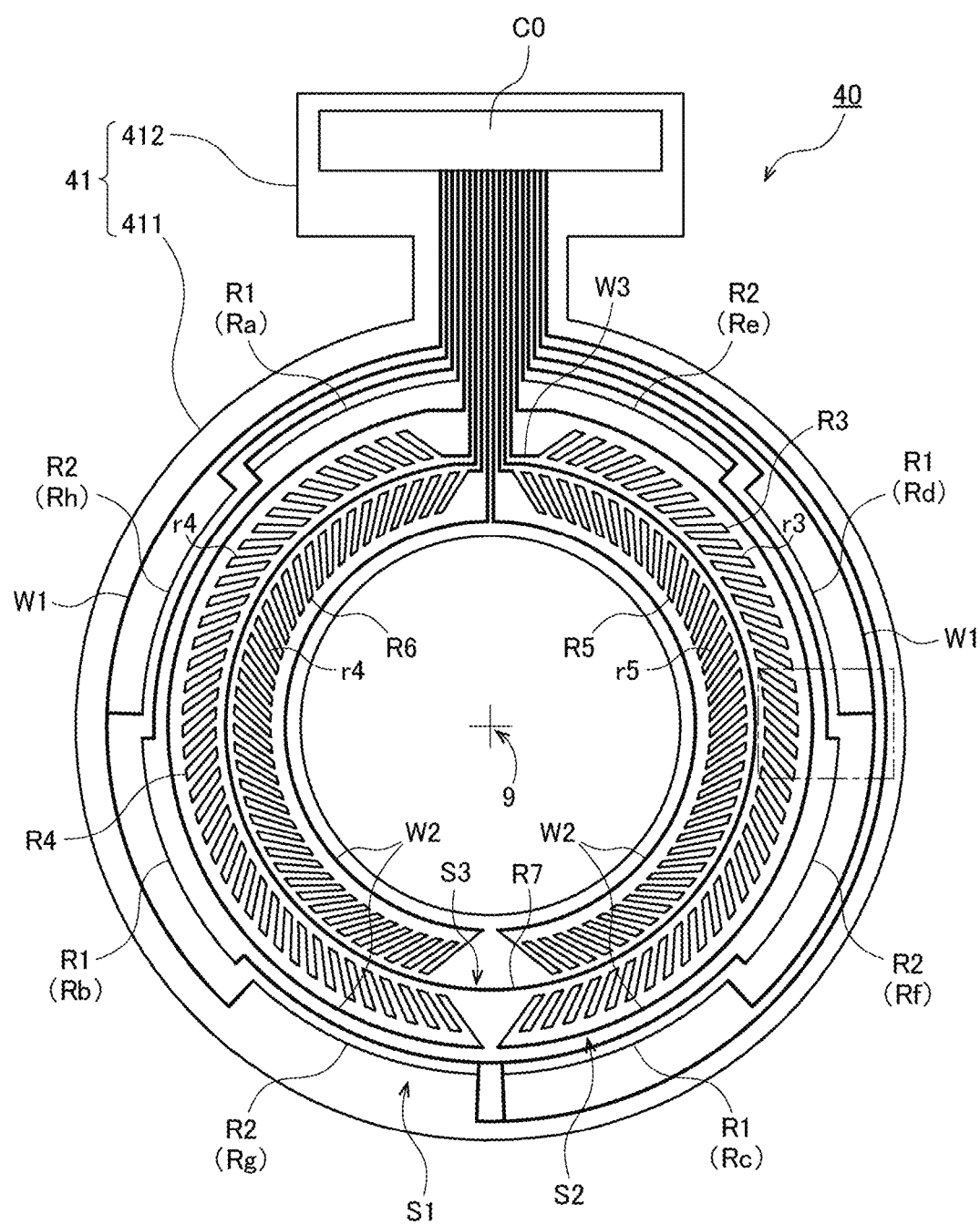

[Fig. 4]
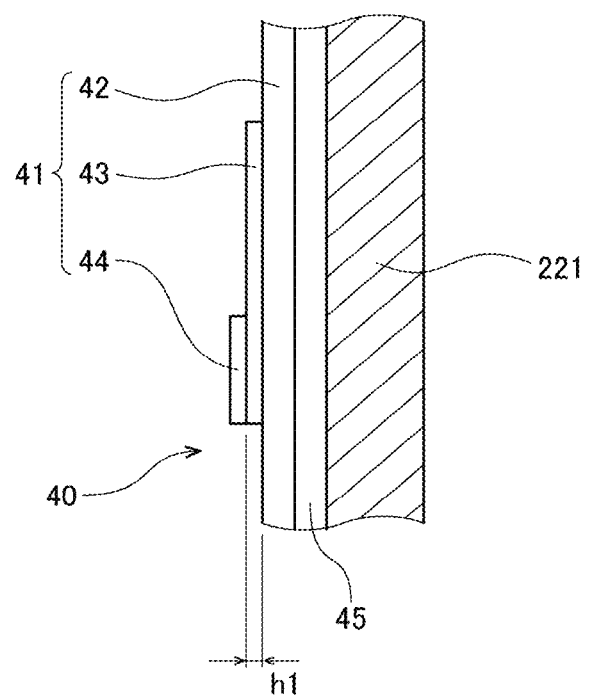

[Fig. 5]
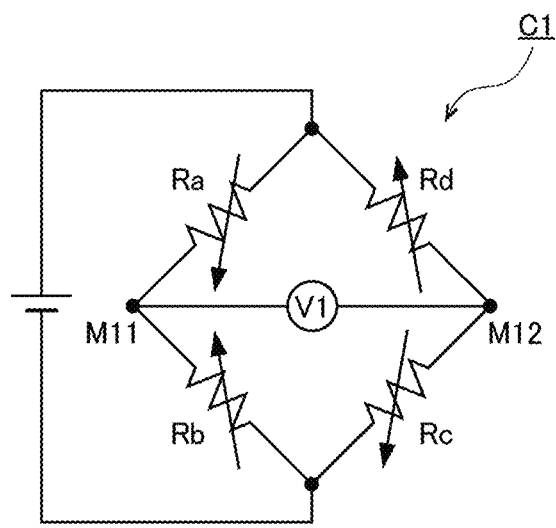
[Fig. 6]
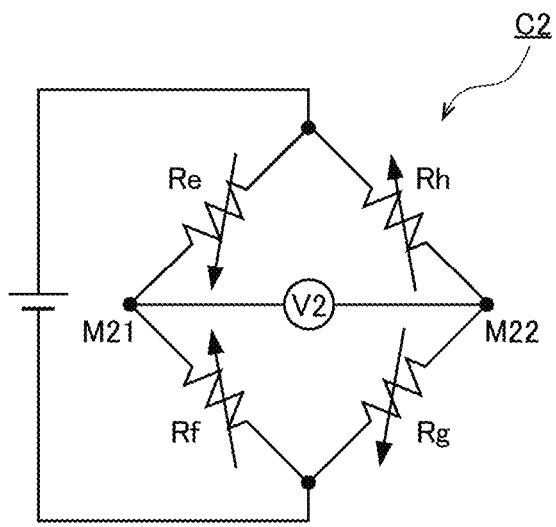

[Fig. 7]
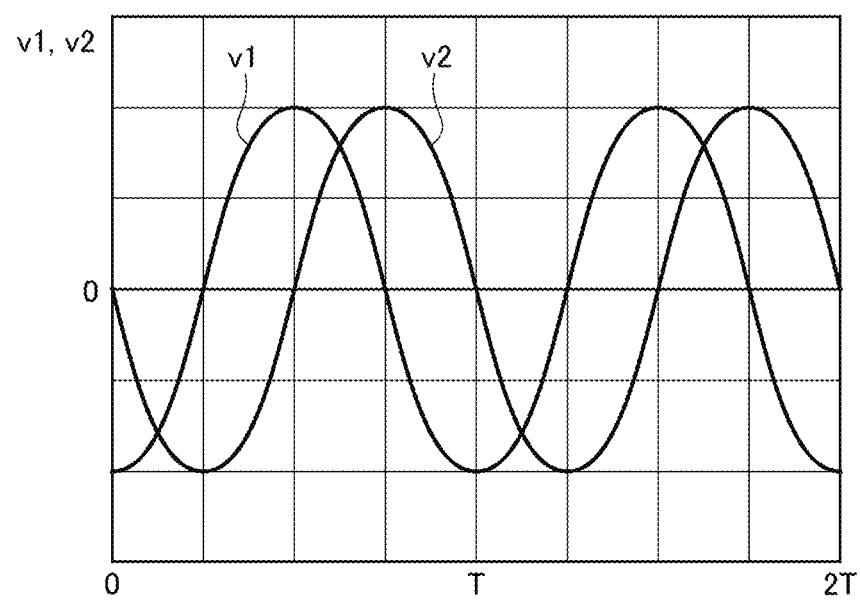

[Fig. 8]
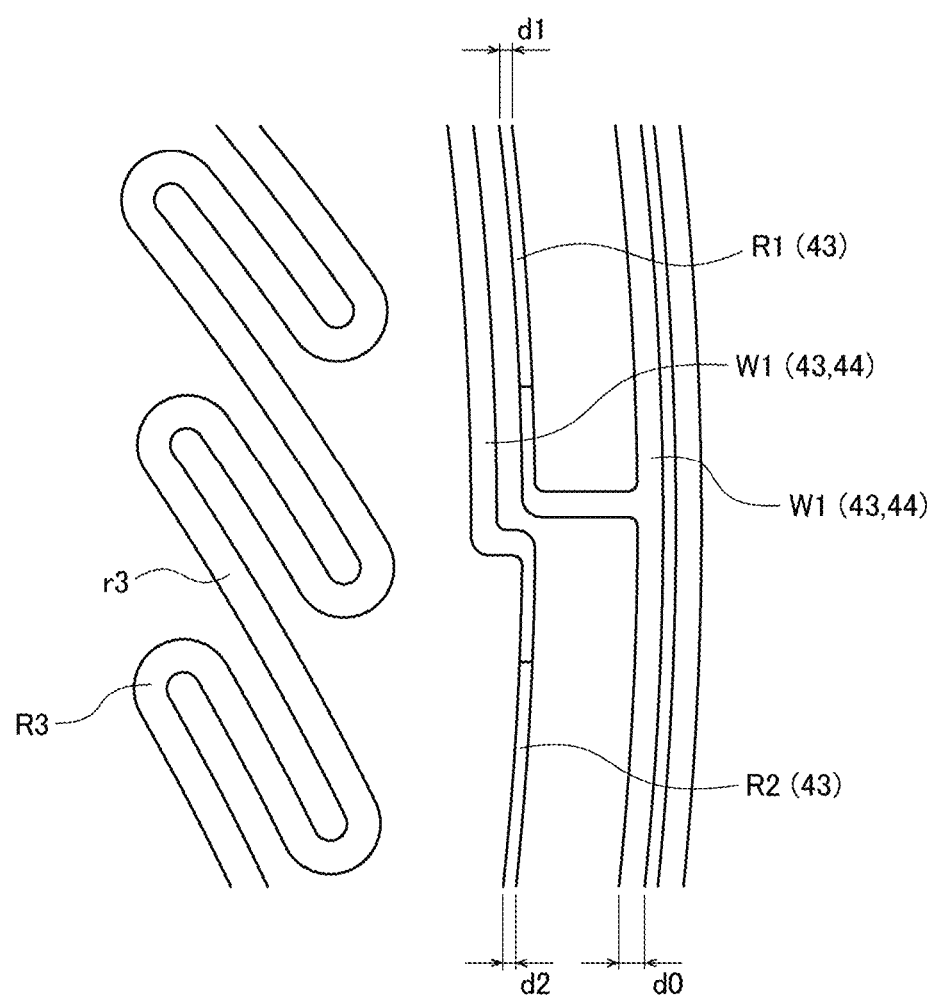

[Fig. 9]
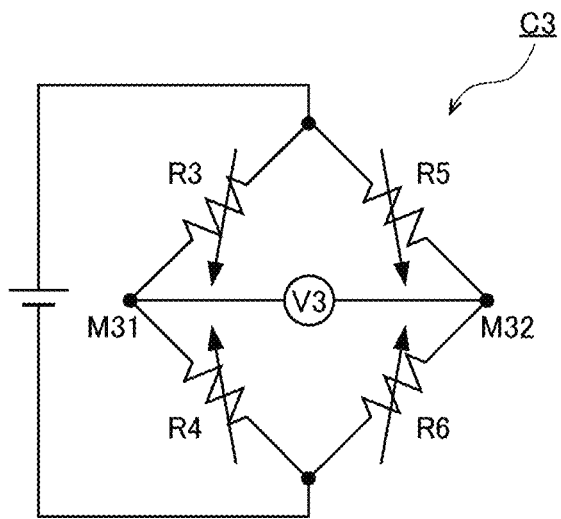
[Fig. 10]
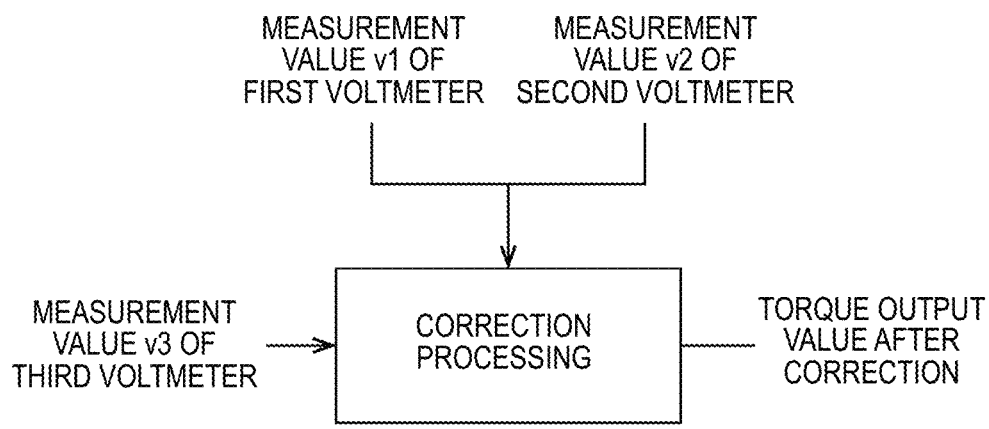

[Fig. 11]
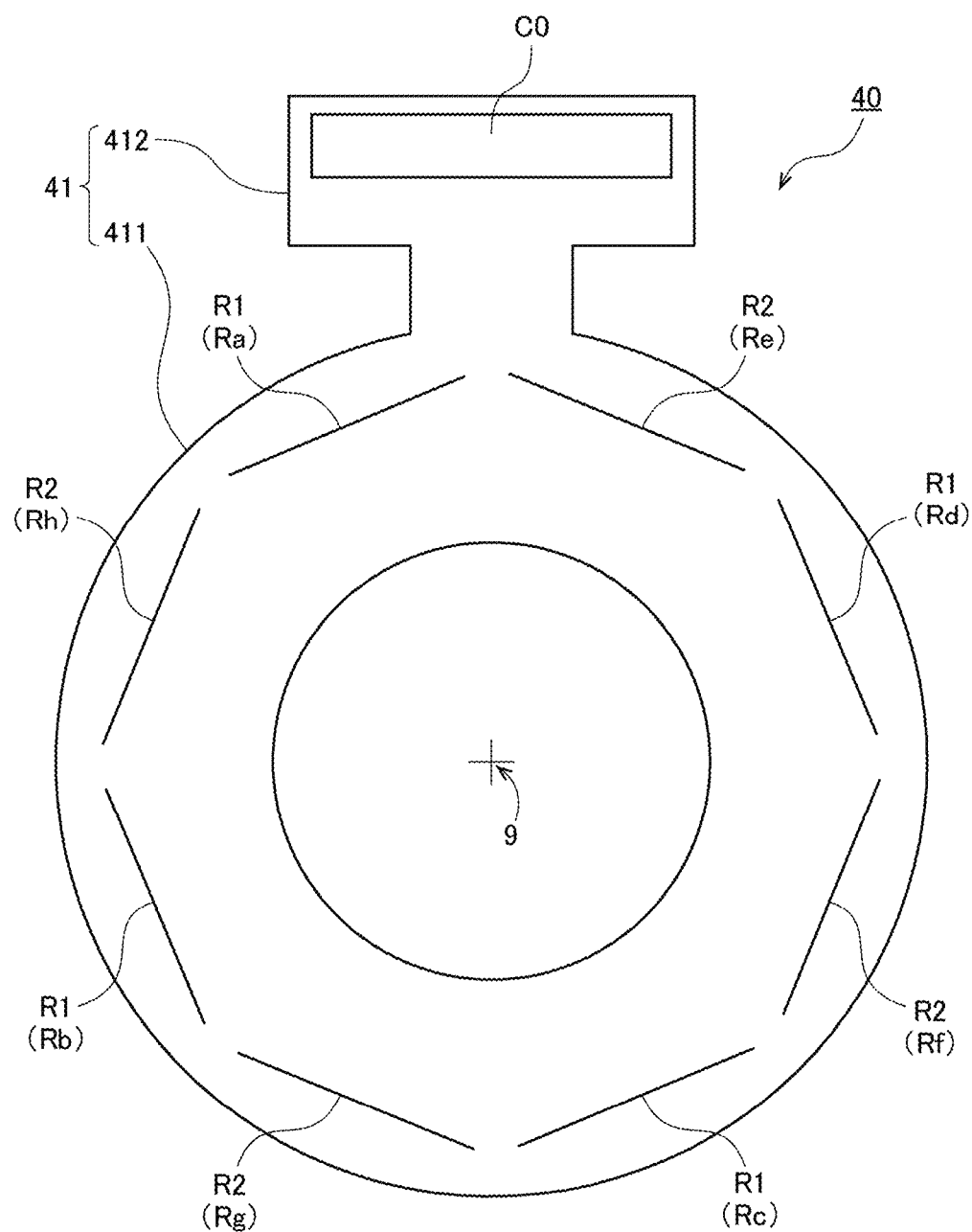

[Fig. 12]
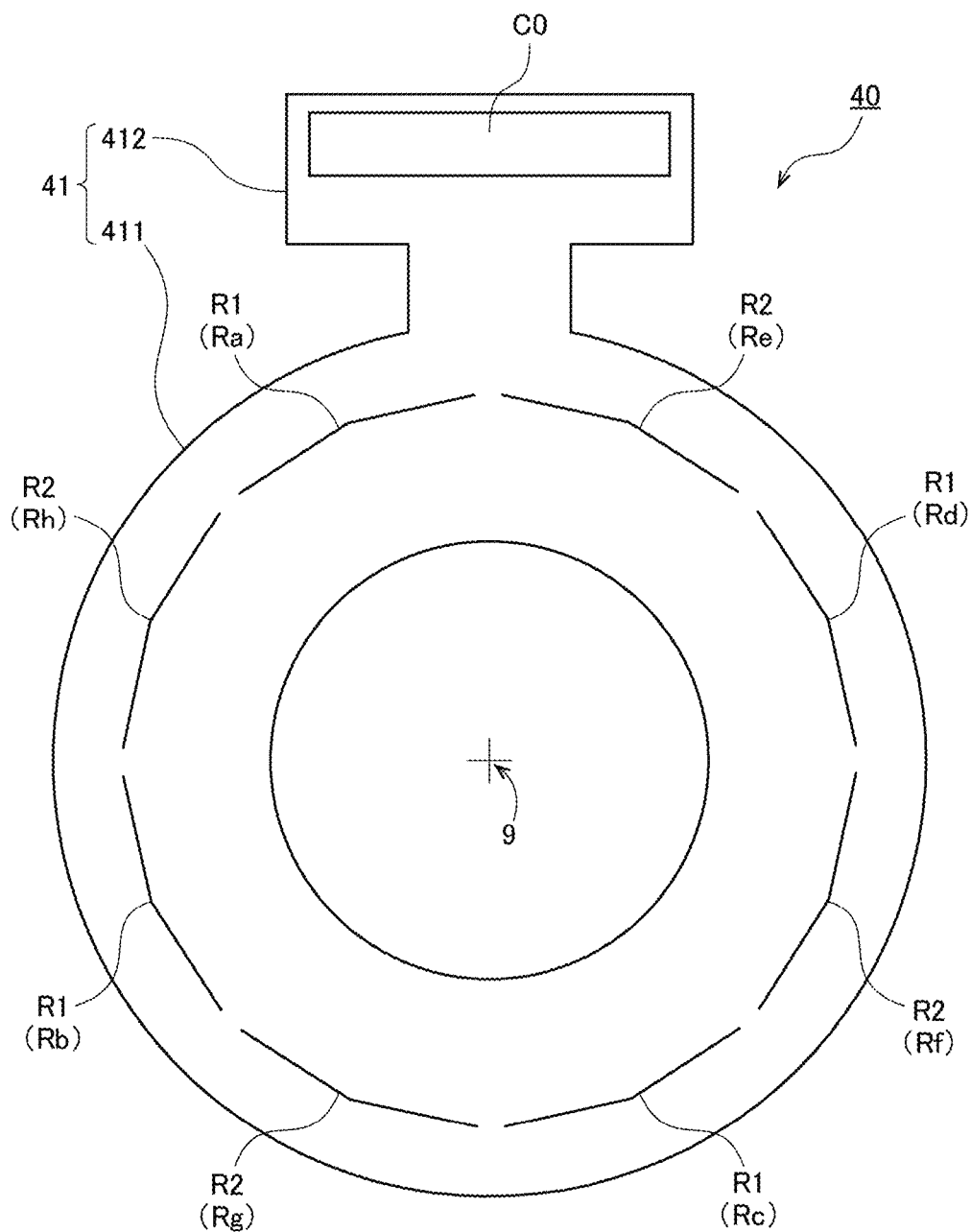

[Fig. 13]
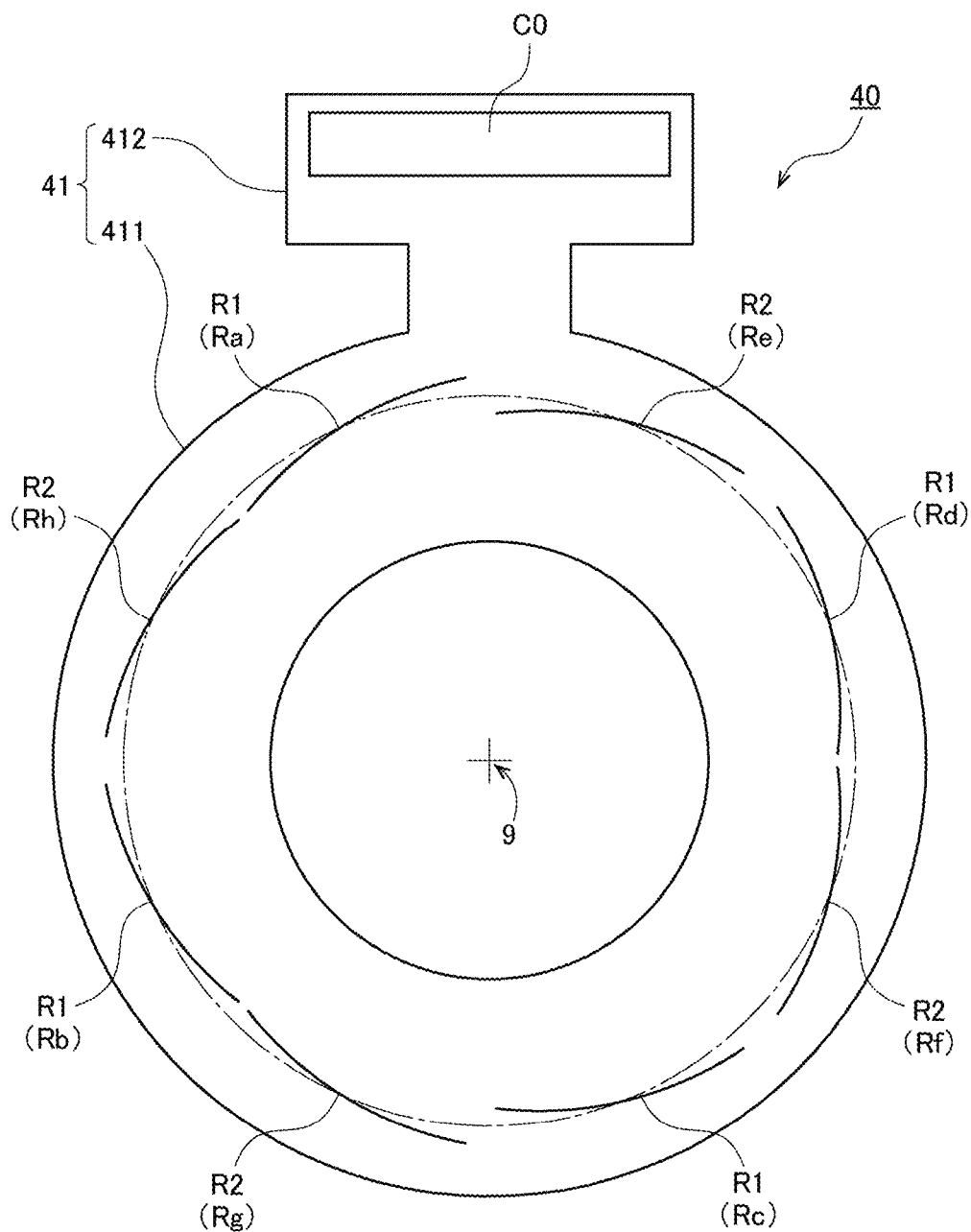

[Fig. 14]
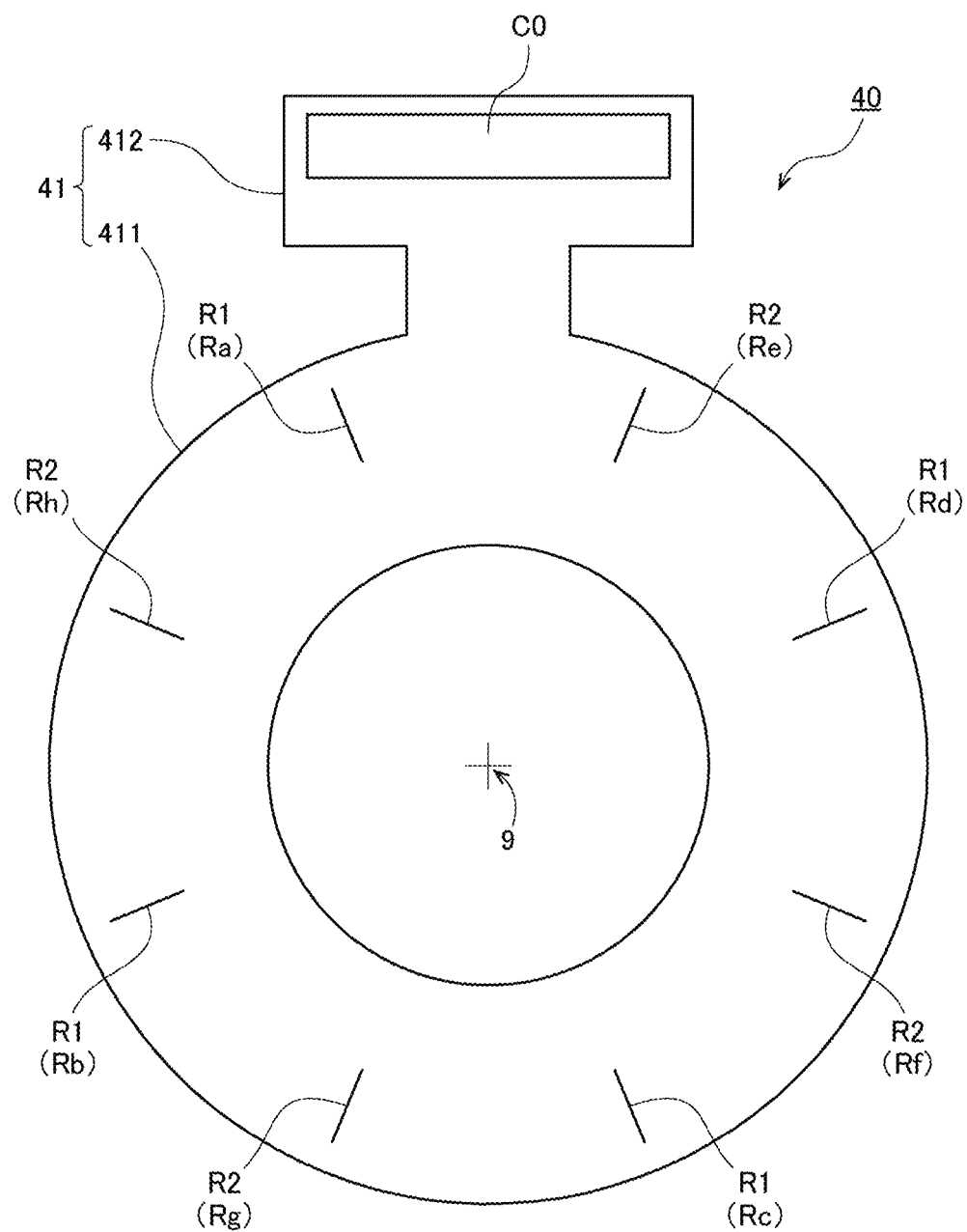

SENSOR AND POWER TRANSMISSION DEVICE

CROSS-REFERENCE TO RELATED APPLICATIONS

The present application claims priority under 35 U.S.C. § 119 to Japanese Patent Application No. 2021-103999, filed on Jun. 23, 2021, the entire contents of which are hereby incorporated herein by reference.

1. FIELD OF THE INVENTION

The present disclosure relates to a sensor and a power transmission device.

2. BACKGROUND

In recent years, a demand for a speed reducer mounted on a joint of a robot and the like is rapidly increased. In a conventional speed reducer, a strain gauge is attached to a flexible external gear that rotates at a rotational frequency after deceleration. This enables detection of torque applied to the flexible external gear.

However, the flexible external gear used in this type of speed reducer repeats periodically flexural deformation. For this reason, an output value of the strain gauge includes a component caused by the torque originally to be measured and an error component caused by the periodic deformation of the flexible external gear. The error component changes according to a rotation angle of rotational motion input to the flexible external gear.

Accordingly, it is conceivable that a resistance line is provided in the strain gauge in order to detect the rotation angle of the rotational motion input to the flexible external gear. Then, the torque applied to the flexible external gear can be accurately output by subtracting the error component corresponding to the rotation angle detected by the resistance line from the detection value of the torque.

However, in that case, the resistance line detecting the torque and the resistance line detecting the rotation angle are required to be disposed in a limited space. For this reason, a region occupied by the resistance line detecting the rotation angle is required to be minimized.

SUMMARY

A sensor according to an example embodiment of the present disclosure includes a base extending in a direction intersecting with a central axis, first resistance lines arrayed in a circumferential direction on a surface of the base, and second resistance lines arranged concentrically with the first resistance lines and between the first resistance lines in the circumferential direction on the surface of the base. In at least one of the first resistance lines, a number of regions of the resistance line along the circumferential direction is one or less, and a number of regions of the resistance line along a radial direction is one or less.

The above and other elements, features, steps, characteristics and advantages of the present disclosure will become more apparent from the following detailed description of the example embodiments with reference to the attached drawings.

BRIEF DESCRIPTION OF THE DRAWINGS

FIG. 1 is a longitudinal sectional view of a power transmission device according to an example embodiment of the present disclosure.

FIG. 2 is a transversely sectional view of the power transmission device.

FIG. 3 is a plan view of a sensor according to an example embodiment of the present disclosure.

FIG. 4 is a partially sectional view of a diaphragm and the sensor.

FIG. 5 is a circuit diagram illustrating a first bridge circuit according to an example embodiment of the present disclosure including four first resistance lines.

FIG. 6 is a circuit diagram illustrating a second bridge circuit including according to an example embodiment of the present disclosure four second resistance lines.

FIG. 7 is a graph illustrating a measurement value of a first voltmeter and a measurement value of a second voltmeter according to an example embodiment of the present disclosure.

FIG. 8 is a partial plan view of the sensor.

FIG. 9 is a circuit diagram illustrating a third bridge circuit including according to an example embodiment of the present disclosure a third resistance line to a sixth resistance line.

FIG. 10 is a view conceptually illustrating correction processing according to an example embodiment of the present disclosure.

FIG. 11 is a plan view illustrating a sensor according to a first modification of an example embodiment of the present disclosure.

FIG. 12 is a plan view illustrating a sensor of a second modification of an example embodiment of the present disclosure.

FIG. 13 is a plan view illustrating a sensor of a third modification of an example embodiment of the present disclosure.

FIG. 14 is a plan view illustrating a sensor of a fourth modification of an example embodiment of the present disclosure.

DETAILED DESCRIPTION

With reference to the drawings, example embodiments of the present disclosure will be described below.

In the present application, a direction parallel to a central axis of a power transmission device is referred to as an "axial direction", a direction perpendicular to a central axis of the power transmission device is referred to as a "radial direction", and a direction along an arc about the central axis of the power transmission device is referred to as a "circumferential direction". However, the "parallel direction" also includes a substantially parallel direction. Moreover, the "direction perpendicular to the central axis" also involves a direction substantially perpendicular to the central axis.

In the present application, the "rotational frequency" represents the rotational frequency per unit time, namely, the rotation speed.

FIG. 1 is a longitudinal sectional view illustrating a power transmission device 1 according to an example embodiment. FIG. 2 is a transversely sectional view illustrating the power transmission device 1 when viewed from an A-A position in FIG. 1. The power transmission device 1 is a device that transmits rotational motion of a first rotational frequency obtained from a motor to a subsequent stage while decelerating the rotational motion to a second rotational frequency lower than the first rotational frequency. For example, the power transmission device 1 is used by being incorporated in a joint of a robot together with the motor. However, the power transmission device of the present disclosure may be used for other devices such as an assist suit and an unmanned conveying truck.

As illustrated in FIGS. 1 and 2, the power transmission device 1 of the example embodiment includes an internal gear 10, a flex gear 20, a wave generator 30, and a sensor 40. The power transmission device 1 includes the sensor 40, so that the power transmission device 1 can be downsized.

The internal gear 10 is an annular gear including a plurality of internal teeth 11 on an inner circumferential surface. The internal gear 10 is fixed to a frame body of the device on which the power transmission device 1 is mounted by, for example, a bolt. The internal gear 10 is disposed coaxially with a central axis 9. In addition, the internal gear 10 is located on a radially outer side of a cylindrical portion 21 described later of the flex gear 20. Rigidity of the internal gear 10 is much higher than rigidity of the cylindrical portion 21 of the flex gear 20. For this reason, the internal gear 10 can be regarded as a substantially rigid body. The internal gear 10 has a cylindrical inner circumferential surface. The plurality of internal teeth 11 are arrayed at a constant pitch in a circumferential direction on the inner circumferential surface. Each of the internal teeth 11 protrudes radially inward.

The flex gear 20 is a flexurally deformable annular gear. The flex gear 20 is supported so as to be rotatable about the central axis 9. The flex gear 20 is an example of the "flexible assembly" in the present disclosure.

The flex gear 20 of the example embodiment includes the cylindrical portion 21 and a plate portion 22. The cylindrical portion 21 extends in a cylindrical shape in the axial direction around the central axis 9. An axial distal end of the cylindrical portion 21 is located radially outside the wave generator 30 and radially inside the internal gear 10. The cylindrical portion 21 is deformable in the radial direction because the cylindrical portion 21 has flexibility. In particular, the distal end of the cylindrical portion 21 located on the radially inner side of the internal gear 10 can be displaced in the radial direction more than other portions because the distal end of the cylindrical portion 21 is a free end.

The flex gear 20 has a plurality of external teeth 23. The plurality of external teeth 23 are provided on the radially outer surface in the vicinity of the distal end in the axial direction of the cylindrical portion 21. The plurality of external teeth 23 is arrayed at a constant pitch in the circumferential direction. Each of the external teeth 23 protrudes radially outward. The number of the internal teeth 11 of the internal gear 10 is slightly different from the number of the external teeth 23 of the flex gear 20.

The plate portion 22 includes a diaphragm 221 and a thick portion 222. The diaphragm 221 expands in a plate shape radially outward from a base end in the axial direction of the cylindrical portion 21 and expands in an annular shape around the central axis 9. The diaphragm 221 is slightly flexurally deformable in the axial direction. The thick portion 222 is an annular portion located radially outside the diaphragm 221. A thickness of the thick portion 222 in the axial direction is larger than a thickness of the diaphragm 221 in the axial direction. The thick portion 222 is fixed to a component to be driven of the device on which the power transmission device 1 is mounted by, for example, a bolt.

The wave generator 30 is a mechanism that generates the periodically flexural deformation in the cylindrical portion 21 of the flex gear 20. The wave generator 30 includes a cam 31 and a flexible bearing 32. The cam 31 is supported so as to be rotatable about the central axis 9. The radially outer surface of the cam 31 has an elliptical shape when viewed in the axial direction. The flexible bearing 32 is interposed between the radially outer surface of the cam 31 and the radially inner surface of the cylindrical portion 21 of the flex gear 20. Accordingly, the cam 31 and the cylindrical portion 21 can rotate at different rotational frequencies.

An inner ring of the flexible bearing 32 is in contact with the radially outer surface of the cam 31. The outer ring of the flexible bearing 32 is in contact with the radially inner surface of the flex gear 20. For this reason, the cylindrical portion 21 of the flex gear 20 is deformed in an elliptical shape along the radially outer surface of the cam 31. As a result, the external teeth 23 of the flex gear 20 and the internal teeth 11 of the internal gear 10 mesh with each other at two positions corresponding to both ends of the major axis of the ellipse. At other positions in the circumferential direction, the external teeth 23 and the internal teeth 11 do not mesh with each other.

The cam 31 is connected to the motor directly or through another power transmission mechanism. When the motor is driven, the cam 31 rotates at the first rotational frequency about the central axis 9. Thus, the major axis of the ellipse of the flex gear 20 also rotates at the first rotational frequency. Then, the meshing position between the external teeth 23 and the internal teeth 11 also changes at the first rotational frequency in the circumferential direction. As described above, the number of the internal teeth 11 of the internal gear 10 is slightly different from the number of the external teeth 23 of the flex gear 20. Due to this difference in the number of teeth, the meshing position between the external teeth 23 and the internal teeth 11 slightly changes in the circumferential direction every rotation of the cam 31. As a result, the flex gear 20 rotates about the central axis 9 with respect to the internal gear 10 at the second rotational frequency lower than the first rotational frequency. Accordingly, the rotational motion of the reduced second rotational frequency can be taken out from the flex gear 20.

The sensor 40 is a detector detecting a circumferential torque applied to the flex gear 20. The sensor 40 is fixed to the diaphragm 221 of the flex gear 20. The diaphragm 221 includes a surface 223 that intersects with the central axis 9 and expands in the annular shape around the central axis 9. The surface 223 is a surface facing the axial direction. The sensor 40 is fixed to the surface 223 of the diaphragm 221.

FIG. 3 is a plan view of the sensor 40. FIG. 4 is a partially sectional view of the diaphragm 221 and the sensor 40. As illustrated in FIGS. 3 and 4, the sensor 40 includes a circuit board 41. In the circuit board 41 of the example embodiment, a conductor is formed on the surface of a flexibly deformable insulating layer 42. The circuit board 41 includes a main body 411 and a flap 412. The main body 411 is an annular portion around the central axis 9. The flap 412 is a portion protruding radially outward from the main body 411.

As illustrated in FIG. 4, the circuit board 41 includes the insulating layer 42, a first conductor layer 43, and a second conductor layer 44. The insulating layer 42 spreads in a direction intersecting with the central axis 9. The insulating layer 42 is made of resin that is an insulator or an inorganic insulating material. The insulating layer 42 is an example of the "base" in the present disclosure. The insulating layer 42 is disposed on the surface 223 of the diaphragm 221. That is, the insulating layer 42 expands in the direction intersecting with the central axis 9 and is disposed on the surface of the flex gear 20 that is flexurally deformable. Thus, the deflection of the diaphragm 42 can be accurately detected by the sensor 40. The first conductor layer 43 and the second conductor layer 44 are made of metal that is a conductor. The first conductor layer 43 is formed on the surface of the insulating layer 42. For example, a material containing copper or a material containing chromium is used for a material of the first conductor layer 43. The second conductor layer 44 is laminated on the surface of the first conductor layer 43. For example, copper, silver, or gold is used for a material of the second conductor layer 44.

At the time of manufacturing the circuit board 41, first, a thin film of metal constituting the first conductor layer 43 is formed on the entire surface of the insulating layer 42. Then, the formed metal thin film is partially etched in accordance with the shapes of a first resistance line R1 to a seventh resistance line R7 and connection lines W1 to W3 to be described later. Thus, the first conductor layer 43 is formed. Thereafter, a thin film of the metal constituting the second conductor layer 44 is formed on the surfaces of the insulating layer 42 and the first conductor layer 43. Then, the formed metal thin film is partially etched in accordance with the shapes of the connection lines W1 to W3 to be described later. Thus, the second conductor layer 44 is formed. At that time, the second conductor layer 44 is formed of a metal material different from the first conductor layer 43, so that the second conductor layer 44 can be etched without etching the first conductor layer 43. However, the method for manufacturing the circuit board 41 is not limited to this example.

As illustrated in FIG. 4, the circuit board 41 is fixed to the surface 223 of the diaphragm 221 by a double-sided adhesive tape 45. Specifically, the surface 223 of the diaphragm 221 and a back surface of the circuit board 41 are fixed through the double-sided adhesive tape 45. In the double-sided adhesive tape 45, a material having adhesive force is molded into a tape shape, and cured to such an extent that the shape can be maintained. The use of such the double-sided adhesive tape 45 makes it easier to fix the sensor 40 to the diaphragm 221 than in the case of using an adhesive having fluidity. Furthermore, variations in the fixing work by the operator can be reduced.

In order to accurately transmit the deformation of the diaphragm 221 to the sensor 40, it is preferable that the double-sided adhesive tape 45 does not have a base film, but is made of only the adhesive material.

As illustrated in FIG. 3, the sensor 40 of the example embodiment includes a signal processing circuit C0. The signal processing circuit C0 is disposed in the flap 412. In addition, the sensor 40 of the example embodiment includes a rotation angle detection sensor S1, a torque detection sensor S2, and a temperature detection sensor S3. Each detection sensor will be described in detail below.

The rotation angle detection sensor S1 is a sensor that detects the rotation angle of the rotational motion input to the flex gear 20 in order to correct the detection value of the torque detection sensor S2. That is, the detection value of the torque detection sensor S2 can be corrected by existence of the rotation angle detection sensor S1.

As illustrated in FIG. 3, the rotation angle detection sensor S1 includes four first resistance lines R1 and four second resistance lines R2. The four first resistance lines R1 and the four second resistance lines R2 are disposed on the surface of the insulating layer 42. The four first resistance lines R1 and the four second resistance lines R2 are constituted of the first conductor layer 43.

The plurality of first resistance lines R1 are arrayed in the circumferential direction on the surface of the insulating layer 42. The four first resistance lines R1 are arrayed at equal intervals in the circumferential direction around the central axis 9. Each of the four first resistance lines R1 is one conductor. Each first resistance line R1 extends in an arcuate shape along the circumferential direction. The four second resistance lines R2 are arrayed at equal intervals in the circumferential direction around the central axis 9. Each of the four second resistance lines R2 is one conductor. Each second resistance line R2 extends in an arcuate shape along the circumferential direction.

The four first resistance lines R1 and the four second resistance lines R2 are arranged concentrically. Each second resistance line R2 is disposed between the two first resistance lines R1 adjacent to each other in the circumferential direction. The central portion in the circumferential direction of the first resistance lines R1 and the central portion in the circumferential direction of the second resistance lines R2 are alternately arranged at an interval of 45° around the central axis 9. In the example embodiment, the four first resistance lines R1 and the four second resistance lines R2 are arranged in an annular shape centered on the central axis 9 as a whole. That is, the plurality of second resistance lines R2 are disposed on the surface of the insulating layer 42 concentrically with the plurality of first resistance lines R1 and between the first resistance lines R1 in the circumferential direction. The rotation angle of the rotational motion input to the flex gear 20 can be accurately detected by disposing the plurality of first resistance lines R1 and the plurality of second resistance lines R2 in this manner.

FIG. 5 is a circuit diagram illustrating the first bridge circuit C1 including the four first resistance lines R1. In the example of FIG. 5, the four first resistance lines R1 are distinguished as Ra, Rb, Rc, Rd. The first resistance lines Ra, Rb, Rc, Rd are arranged in the order of Ra, Rb, Rc, Rd counterclockwise from Ra in FIG. 3.

As illustrated in FIG. 5, the four first resistance lines Ra, Rb, Rc, Rd are incorporated in the first bridge circuit C1. The first resistance line Ra and the first resistance line Rb are connected in series in this order. The first resistance line Rd and the first resistance line Rc are connected in series in this order. Then, columns of the two first resistance lines Ra, Rb and columns of the two first resistance lines Rd, Rc are connected in parallel between a positive pole and a negative pole of the power supply voltage. Furthermore, an intermediate point M11 between the first resistance line Ra and the first resistance line Rb and an intermediate point M12 between the first resistance line Rd and the first resistance line Rc are connected to a first voltmeter V1.

FIG. 6 is a circuit diagram illustrating a second bridge circuit C2 including the four second resistance lines R2. In the example of FIG. 6, the four second resistance lines R2 are distinguished as Re, Rf, Rg, Rh. In FIG. 3, the second resistance line Re is located between the first resistance line Ra and the first resistance line Rd. The second resistance lines Re, Rf, Rg, Rh are arrayed in the order of Re, Rf, Rg, Rh clockwise from Re in FIG. 3.

As illustrated in FIG. 6, the four second resistance lines Re, Rf, Rg, Rh are incorporated in the second bridge circuit C2. The second resistance line Re and the second resistance line Rf are connected in series in this order. The second resistance line Rh and the second resistance line Rg are connected in series in this order. Then, the columns of the two second resistance lines Re, Rf and the columns of the two second resistance lines Rh, Rg are connected in parallel between the positive pole and the negative pole of the power supply voltage. Furthermore, an intermediate point M21 between the second resistance line Re and the second resistance line Rf and an intermediate point M22 between the second resistance line Rh and the second resistance line Rg are connected to a second voltmeter V2.

When the power transmission device 1 is driven, a portion extending in the circumferential direction (hereinafter referred to as an "extension portion") and a portion contracting in the circumferential direction (hereinafter referred to as a "contraction portion") are generated in the diaphragm 221. Specifically, two extension portions and two contraction portions are alternately generated in the circumferential direction. That is, the extension portion and the contraction portion are alternately generated at intervals of 90° in the circumferential direction around the central axis 9. Then, the point where the extension portion and the contraction portion are generated rotates at the first rotational frequency.

The resistance values of the first resistance lines Ra, Rb, Rc, Rd and the second resistance lines Re, Rf, Rg, Rh change according to the expansion and contraction in the circumferential direction of the diaphragm 221. For example, when the extension portion overlaps with a certain resistance line, the resistance value of the resistance line increases. In addition, when the contraction portion overlaps with a certain resistance line, the resistance value of the resistance line decreases.

In the example of FIG. 3, when the contraction portion overlaps with the first resistance lines Ra, Rc, the expansion portion overlaps with the first resistance lines Rb, Rd. When the extension portion overlaps with the first resistance lines Ra, Rc, the contraction portion overlaps with the first resistance lines Rb, Rd. Therefore, in the first bridge circuit C1, the first resistance lines Ra, Rc and the first resistance lines Rb, Rd exhibit resistance value changes in opposite directions.

In the example of FIG. 3, when the contraction portion overlaps with the second resistance lines Re, Rg, the extension portion overlaps with the second resistance lines Rf, Rh. When the extension portion overlaps with the second resistance lines Re, Rg, the contraction portion overlaps with the second resistance lines Rf, Rh. Therefore, in the second bridge circuit C2, the second resistance lines Re, Rg and the second resistance lines Rf, Rh exhibit resistance value changes in opposite directions.

FIG. 7 is a graph illustrating a measurement value v1 of the first voltmeter V1 of the first bridge circuit C1 and a measurement value v2 of the second voltmeter V2 of the second bridge circuit C2. When the power transmission device 1 is driven, sinusoidal measurement values v1, v2 that periodically change are output from the first voltmeter V1 and the second voltmeter V2, respectively, as illustrated in FIG. 7. A period T of the measurement values v1, v2 corresponds to ½ times the period of the first rotational frequency. The direction of the input rotational motion can be determined based on whether the phase of the measurement value v2 of the second voltmeter V2 is advanced by ⅛ period (¼ period of measurement values v1, v2) of the first rotational frequency or delayed by ⅛ period (¼ period of measurement values v1, v2) of the first rotational frequency with respect to the phase of the measurement value v1 of the first voltmeter V1.

Accordingly, the rotation angle of the rotational motion input to the flex gear 20 can be detected based on the measurement value v1 of the first voltmeter V1 and the measurement value v2 of the second voltmeter V2. Specifically, for example, a function table in which a combination of the measurement value v1 of the first voltmeter V1 and the measurement value v2 of the second voltmeter V2 is associated with the rotation angle is previously prepared, and the measurement values v1, v2 may be input to the function table to output the rotation angle.

As described above, in the example embodiment, the first bridge circuit C1 and the second bridge circuit C2 function as a detection circuit that detects the rotation angle of the rotational motion input to the flex gear 20. That is, in the example embodiment, the sensor 40 attached to the flex gear 20 includes the detection circuit. For this reason, wiring extending to the outside of the sensor 40 can be reduced as compared with the case where the sensor 40 does not include the detection circuit. As a result, attachment of the sensor 40 to the flex gear 20 is facilitated. The detection circuit includes the first resistance line R1 and the second resistance line R2. That is, the detection circuit includes the first bridge circuit C1 and the second bridge circuit C2, so that the rotation angle of the rotational motion input to the flex gear 20 that is the flexible assembly can be appropriately detected.

In the example embodiment, each of the plurality of first resistance lines R1 has an arc shape extending along the circumferential direction from one end to the other end in the circumferential direction. That is, each first resistance line R1 is constituted by a region of one resistance line along the circumferential direction. Thus, the region occupied by the first resistance line R1 on the surface of the insulating layer 42 can be reduced as compared with the case where the first resistance line R1 has a plurality of resistance line regions along the circumferential direction.

Similarly, in the example embodiment, each of the plurality of second resistance lines R2 has an arc shape extending along the circumferential direction from one end to the other end in the circumferential direction. That is, each of the second resistance lines R2 is constituted by a region of one resistance line along the circumferential direction. Therefore, the region occupied by the second resistance line R2 on the surface of the insulating layer 42 can be reduced as compared with the case where the second resistance line R2 has a plurality of resistance line regions along the circumferential direction.

FIG. 8 is a partial plan view of the sensor 40. Specifically, FIG. 8 is an enlarged view illustrating the vicinity of a region surrounded by a two-dot chain line in FIG. 3. As illustrated in FIGS. 3 and 8, the sensor 40 includes a plurality of connection lines W1. Some of the connection lines W1 extend from the ends of the first resistance lines R1 to connect the plurality of first resistance lines R1 to each other. Thus, the first bridge circuit C1 is formed. Some of other connection lines W1 extend from the ends of the second resistance lines R2 to connect the plurality of second resistance lines R2 to each other. Thus, the second bridge circuit C2 is formed.

As illustrated in FIG. 8, the first resistance line R1 and the second resistance line R2 are constituted of the first conductor layer 43. That is, the first conductor layer 43 is exposed on the surfaces of the first resistance line R1 and the second resistance line R2. On the other hand, the connection line W1 is constituted of the first conductor layer 43 and the second conductor layer 44. That is, the second conductor layer 44 is laminated on the surface of the connection line W1.

When the connection line W1 is constituted of the first conductor layer 43 and the second conductor layer 44 as described above, the resistance value of the connection line W1 decreases as compared with the case where the connection line W1 is constituted only of the first conductor layer 43. Thus, the relative resistance values of the first resistance line R1 and the second resistance line R2 increase. Accordingly, the influence of the change in the resistance value of the connection line W1 on the measurement values v1, v2 can be reduced in the first bridge circuit C1 and the second bridge circuit C2. That is, the measurement value v1 of the first voltmeter V1 more accurately reflects the change in the resistance value of the first resistance line R1. The measurement value v2 of the second voltmeter V2 more accurately reflects the change in the resistance value of the second resistance line R2.

Accordingly, even when the first resistance line R1 and the second resistance line R2 do not have the plurality of resistance line regions along the circumferential direction, the rotation angle of the rotational motion input to the flex gear 20 can be accurately detected based on the measurement value v1 of the first voltmeter V1 and the measurement value v2 of the second voltmeter V2.

A specific resistance of the material of the second conductor layer 44 is desirably lower than a specific resistance of the material of the first conductor layer 43. Alternatively, a gauge factor of the material of the second conductor layer 44 is desirably lower than a gauge factor of the material of the first conductor layer 43. When the material having the low specific resistance or gauge factor is used for the second conductor layer 44, the resistance value of the connection line W1 can be more effectively reduced by laminating the second conductor layer 44. Accordingly, the detection accuracy of the rotation angle by the first resistance line R1 and the second resistance line R2 can be further improved. Accordingly, even when the first resistance line R1 and the second resistance line R2 do not have the plurality of resistance line regions along the circumferential direction, the rotation angle of the rotational motion input to the flex gear 20 can be accurately detected based on the measurement value v1 of the first voltmeter V1 and the measurement value v2 of the second voltmeter V2.

For example, the material of the first conductor layer 43 may be a material containing copper such as a Cu—Ni alloy, and the material of the second conductor layer 44 may be copper. Alternatively, the material of the first conductor layer 43 may be a material containing chromium, and the material of the second conductor layer 44 may be gold. However, the material of first conductor layer 43 may be chromium, chromium nitride, chromium oxide, or the like. The material of the first conductor layer 43 is the material containing copper or the material containing chromium, and the material of the second conductor layer 44 is copper, silver, or gold, so that the specific resistances and the gauge factors of the first conductor layer 43 and the second conductor layer 44 can be set to preferable conditions as described above.

As illustrated in FIG. 8, a line width d0 of the connection line W1 is wider than a line width d1 of the first resistance line R1 and a line width d2 of the second resistance line R2. In this way, the resistance value of the connection line W1 can be further reduced. Accordingly, the detection accuracy of the rotation angle by the first resistance line R1 and the second resistance line R2 can be further improved. Accordingly, even when the first resistance line R1 and the second resistance line R2 do not have the plurality of resistance line regions along the circumferential direction, the rotation angle of the rotational motion input to the flex gear 20 can be accurately detected based on the measurement value v1 of the first voltmeter V1 and the measurement value v2 of the second voltmeter V2.

The line widths of all portions of the connection line W1 are not necessarily wider than the line width d1 of the first resistance line R1 and the line width d2 of the second resistance line R2. The line width of at least a part of the connection line W1 may be wider than the line width d1 of the first resistance line R1 and the line width d2 of the second resistance line R2.

When the axial thicknesses of the first resistance line R1 and the second resistance line R2 are reduced, the resistance values of the first resistance line R1 and the second resistance line R2 can be further increased. Thus, the detection accuracy of the rotation angle by the first resistance line R1 and the second resistance line R2 can be further improved. Accordingly, even when the first resistance line R1 and the second resistance line R2 do not have the plurality of resistance line regions along the circumferential direction, the rotation angle of the rotational motion input to the flex gear 20 can be accurately detected based on the measurement value v1 of the first voltmeter V1 and the measurement value v2 of the second voltmeter V2.

The axial thickness of the first resistance line R1 and the axial thickness of the second resistance line R2 are desirably, for example, 1000 nm or less. That is, as illustrated in FIG. 4, a thickness h in the axial direction of the first conductor layer 43 is desirably 1000 nm or less.

The torque detection sensor S2 is a sensor that detects a circumferential torque applied to the flex gear 20.

As illustrated in FIG. 3, the torque detection sensor S2 includes the third resistance line R3 to the sixth resistance line R6. The third resistance line R3 to the sixth resistance line R6 are disposed on the surface of the insulating layer 42. The third resistance line R3 to the sixth resistance line R6 are constructed of the first conductor layer 43.

The third resistance line R3 is an arcuate pattern as a whole in which one conductor extends in the circumferential direction while bending in a zigzag manner. In the example embodiment, the third resistance line R3 is provided in a semicircular shape in a range of about 180° around the central axis 9. The third resistance line R3 includes a plurality of detection lines r3. The plurality of detection lines r3 are arrayed in the circumferential direction in a posture substantially parallel to each other. Each detection line r3 is inclined to one side in the circumferential direction with respect to the radial direction. For example, the inclination angle of the detection line r3 with respect to the radial direction is 45°. The ends of the detection lines r3 adjacent to each other in the circumferential direction are alternately connected on the inner side or the outer side in the radial direction. Thus, the plurality of detection lines r3 are connected in series as a whole.

The fourth resistance line R4 is an arcuate pattern as a whole in which one conductor extends in the circumferential direction while bending in a zigzag manner. In the example embodiment, the fourth resistance line R4 is provided in a semicircular shape in a range of about 180° around the central axis 9. The fourth resistance line R4 includes a plurality of detection lines r4. The plurality of detection lines r4 are arrayed in the circumferential direction in a posture substantially parallel to each other. Each detection line r4 is inclined to the other circumferential direction side with respect to the radial direction. For example, the inclination angle of the detection line r4 with respect to the radial direction is 45°. The ends of the detection lines r4 adjacent to each other in the circumferential direction are alternately connected on the inner side or the outer side in the radial direction. Thus, the plurality of detection lines r4 are connected in series as a whole.

The third resistance line R3 and the fourth resistance line R4 are arranged concentrically and line-symmetrically. The radial distance from the central axis 9 to the third resistance line R3 is equal to the radial distance from the central axis 9 to the fourth resistance line R4.

The fifth resistance line R5 is an arcuate pattern as a whole in which one conductor extends in the circumferential direction while bending in a zigzag manner. In the example embodiment, the fifth resistance line R5 is provided in a semicircular shape in a range of about 180° around the central axis 9. The fifth resistance line R5 includes a plurality of detection lines r5. The plurality of detection lines r5 are arrayed in the circumferential direction in a posture substantially parallel to each other. Each detection line r5 is inclined to the other circumferential direction side with respect to the radial direction. For example, the inclination angle of the detection line r5 with respect to the radial direction is 45°. The ends of the detection lines r5 adjacent to each other in the circumferential direction are alternately connected on the inner side or the outer side in the radial direction. Thus, the plurality of detection lines r5 are connected in series as a whole.

The sixth resistance line R6 is an arcuate pattern as a whole in which one conductor extends in the circumferential direction while bending in a zigzag manner. In the example embodiment, the sixth resistance line R6 is provided in a semicircular shape in a range of about 180° around the central axis 9. The sixth resistance line R6 includes a plurality of detection lines r6. The plurality of detection lines r6 are arrayed in the circumferential direction in a posture substantially parallel to each other. Each detection line r6 is inclined to one side in the circumferential direction with respect to the radial direction. For example, the inclination angle of the detection line r6 with respect to the radial direction is 45°. The ends of the detection lines r6 adjacent to each other in the circumferential direction are alternately connected on the inner side or the outer side in the radial direction. Thus, the plurality of detection lines r6 are connected in series as a whole.

The fifth resistance line R5 and the sixth resistance line R6 are arranged concentrically and line-symmetrically. The radial distance from the central axis 9 to the fifth resistance line R5 is equal to the radial distance from the central axis 9 to the sixth resistance line R6. The fifth resistance line R5 and the sixth resistance line R6 are located radially inside the third resistance line R3 and the fourth resistance line R4.

FIG. 9 is a circuit diagram illustrating a third bridge circuit C3 including the third resistance line R3 to the sixth resistance line R6. As illustrated in FIG. 9, the third resistance line R3 to the sixth resistance line R6 are incorporated in the third bridge circuit C3. The third resistance line R3 and the fourth resistance line R4 are connected in series in this order. The fifth resistance line R5 and the sixth resistance line R6 are connected in series in this order. Then, the columns of the third resistance line R3 and the fourth resistance line R4 and the columns of the fifth resistance line R5 and the sixth resistance line R6 are connected in parallel between the positive pole and the negative pole of the power supply voltage. Furthermore, an intermediate point M31 between the third resistance line R3 and the fourth resistance line R4 and an intermediate point M32 between the fifth resistance line R5 and the sixth resistance line R6 are connected to a third voltmeter V3.

The resistance values of the detection lines r3 to r6 of the third resistance line R3 to the sixth resistance line R6 change according to the torque applied to the flex gear 20. For example, when the torque is applied to the flex gear 20 toward one side in the circumferential direction around the central axis 9, the resistance value of each detection line r3 of the third resistance line R3 and the resistance value of each detection line r6 of the sixth resistance line R6 decrease, and the resistance value of each detection line r4 of the fourth resistance line R4 and the resistance value of each detection line r5 of the fifth resistance line R5 increase. On the other hand, when the torque is applied to the flex gear 20 toward the other side in the circumferential direction around the central axis 9, the resistance value of each detection line r3 of the third resistance line R3 and the resistance value of each detection line r6 of the sixth resistance line R6 increase, and the resistance value of each detection line r4 of the fourth resistance line R4 and the resistance value of each detection line r5 of the fifth resistance line R5 decrease. As described above, the third resistance line R3 and the sixth resistance line R6 and the fourth resistance line R4 and the fifth resistance line R5 indicate resistance value changes in directions opposite to each other with respect to the torque.

When the resistance values of the third resistance line R3 to the sixth resistance line R6 change, the potential difference between the intermediate point M31 of the third resistance line R3 and the fourth resistance line R4 and the intermediate point M32 of the fifth resistance line R5 and the sixth resistance line R6 changes, so that the measurement value v3 of the third voltmeter V3 also changes. Accordingly, the direction and the magnitude of the torque applied to the flex gear 20 can be detected based on the measurement value v3 of the third voltmeter V3.

The third resistance line R3 to the sixth resistance line R6 are connected to each other by the connection line W2. Thus, the third bridge circuit C3 is formed. The third resistance line R3 to the sixth resistance line R6 are constituted of the first conductor layer 43. That is, the first conductor layer 43 is exposed on the surfaces of the third resistance line R3 to the sixth resistance line R6. On the other hand, the connection line W2 is constituted of the first conductor layer 43 and the second conductor layer 44. That is, the second conductor layer 44 is laminated on the surface of the connection line W2.

When the connection line W2 is constituted of the first conductor layer 43 and the second conductor layer 44, the resistance value of the connection line W2 decreases as compared with the case where the connection line W2 is constituted only of the first conductor layer 43. Thus, the relative resistance values of the third resistance line R3 to the sixth resistance line R6 increase. Accordingly, the influence of the change in the resistance value of the connection line W2 on the measurement value v3 can be reduced in the third bridge circuit C3. That is, the measurement value v3 of the third voltmeter V3 more accurately reflects the changes in the resistance values of the third resistance line R3 to the sixth resistance line R6. Accordingly, the torque applied to the flex gear 20 can be accurately detected based on the measurement value v3 of the third voltmeter V3.

As described above, in the sensor 40, the region occupied by the plurality of first resistance lines R1 and plurality of second resistance lines R2 constituting the rotation angle detection sensor S1 is small on the surface of the insulating layer 42. For this reason, the plurality of first resistance lines R1 and plurality of second resistance lines R2 constituting the rotation angle detection sensor S1 and the third resistance line R3 to sixth resistance line R6 constituting the torque detection sensor S2 are disposed on the same surface of the insulating layer 42. In this way, the conductor layers are not required to be formed on both the surfaces of the insulating layer 42 at the time of manufacturing the sensor 40. Accordingly, manufacturing cost of the sensor 40 can be reduced.

The first resistance line R1 of the example embodiment has an arc shape extending along the circumferential direction from one end to the other end in the circumferential direction. In addition, the second resistance line R2 of the example embodiment has an arc shape extending along the circumferential direction from one end to the other end in the circumferential direction. Thus, the first resistance line R1 and the second resistance line R2 can be disposed in a narrower range in the radial direction than in the case where the first resistance line R1 and the second resistance line R2 extend in the radial direction. Accordingly, it is possible to secure a wide space where the third resistance line R3 to the sixth resistance line R6 are disposed on the radial inside or the radial outside of the first resistance line R1 and the second resistance line R2.

In the example embodiment, the plurality of first resistance lines R1 and plurality of second resistance lines R2 constituting the rotation angle detection sensor S1 are located radially outside the third resistance lines R3 to sixth resistance lines R6 constituting the torque detection sensor S2. In this way, the connection line W1 extending from the ends of the first resistance line R1 and the second resistance line R2 can be extended to the signal processing circuit C0 on the radially outer side without being blocked by the third resistance line R3 to sixth resistance line R6 constituting the torque detection sensor S2.

When the power transmission device 1 is driven, the periodically flexural deformation is generated in the flex gear 20. For this reason, the measurement value v3 of the third voltmeter V3 includes a component reflecting the torque originally desired to be measured and an error component (ripple) caused by the periodically flexural deformation of the flex gear 20. The error component changes according to the rotation angle of the rotational motion input to the flex gear 20.

Accordingly, the signal processing circuit C0 performs correction processing canceling the error component from the measurement value v3 of the third voltmeter V3. FIG. 10 is a view conceptually illustrating the correction processing of the signal processing circuit C0. As illustrated in FIG. 10, the measurement values v1, v2, v3 of the first voltmeter V1, the second voltmeter V2, and the third voltmeter V3 are input to the signal processing circuit C0. First, the signal processing circuit C0 detects the rotation angle of the rotational motion input to the flex gear 20 based on the measurement values v1, v2 of the first voltmeter V1 and the second voltmeter V2. Then, the error component is calculated according to the detected rotation angle. Thereafter, the measurement value v3 of the third voltmeter V3 is corrected using the calculated error component. That is, the signal processing circuit C0 corrects the measurement value of the torque detection sensor S2 based on the rotation angle detected by the rotation angle detection sensor S1. As a result, the torque applied to the flex gear 20 can be output more accurately.

The signal processing circuit C0 may multiply the measurement values v1, v2 of the first voltmeter V1 and the second voltmeter V2 by a predetermined coefficient without calculating the rotation angle, and combine the measurement values v1, v2 with the measurement value v3 of the third voltmeter V3. In this way, a processing load applied to the calculation of the rotation angle is reduced, so that the calculation speed of the signal processing circuit C0 can be improved.

The sensor 40 of the example embodiment includes the temperature detection sensor S3 in order to correct the influence of the temperature.

As illustrated in FIG. 3, the temperature detection sensor S3 includes the seventh resistance line R7. The seventh resistance line R7 is disposed on the surface of the insulating layer 42. The seventh resistance line R7 is constituted of the first conductor layer 43 and the second conductor layer 44. The seventh resistance line R7 extends in an arc shape about the central axis 9. For this reason, the change in the resistance value of the seventh resistance line R7 due to the torque in the circumferential direction is extremely small. The seventh resistance line R7 extends over the substantially entire circumference around the central axis 9. For this reason, the resistance value of the seventh resistance line R7 is less likely to be affected by the expansion and contraction due to the flexural deformation of the diaphragm 221. Accordingly, the resistance value of the seventh resistance line R7 is predominantly changed by the temperature. Accordingly, when the resistance value of the seventh resistance line R7 is measured, a signal reflecting the temperature of the flex gear 20 can be acquired. That is, the temperature detection sensor S3 detects the temperature of the flex gear 20 by a resistance line extending in an arc shape around the central axis 9.

The signal processing circuit C0 corrects the measurement value v3 of the third voltmeter V3 in consideration of not only the rotation angle but also the resistance value of the seventh resistance line R7. Specifically, the measurement value v3 of the third voltmeter V3 is increased or decreased in a direction in which the change due to the temperature is canceled. In this way, the torque applied to the flex gear 20 can be more accurately detected while the influence of the temperature change is prevented.

When a Cu—Ni alloy having an extremely small change in resistance value due to temperature is used as the material of the first conductor layer 43, as described above, the seventh resistance line R7 is constituted of the first conductor layer 43 and the second conductor layer 44. However, when copper or the like having a large change in resistance value due to temperature is used as the material of the first conductor layer 43, the seventh resistance line R7 may be constituted only of the first conductor layer 43.

The seventh resistance line R7 and the signal processing circuit C0 are connected to each other by the connection line W3. The connection line W3 is constituted of the first conductor layer 43 and the second conductor layer 44. That is, the second conductor layer 44 is laminated on the surface of the connection line W3.

As described above, when the connection line W3 is constituted of the first conductor layer 43 and the second conductor layer 44, the resistance value of the connection line W3 decreases as compared with the case where the connection line W3 is constituted only of the first conductor layer 43. Thus, the relative resistance value of the seventh resistance line R7 increases. Accordingly, the influence of the change in the resistance value of the connection line W3 on the detection value of the temperature detection sensor S3 can be reduced. Accordingly, the temperature of the flex gear 20 can be accurately detected based on the change in the resistance value of the seventh resistance line R7.

Although the example embodiment as an example of the present disclosure is described above, the present disclosure is not limited to the example embodiment.

FIG. 11 is a plan view illustrating the sensor 40 according to a first modification. In FIG. 11, the third resistance line R3 to sixth resistance line R6 constituting the torque detection sensor S2, the seventh resistance line R7 constituting the temperature detection sensor S3, and the connection lines W1 to W3 are not illustrated.

In the example embodiment, each of the four first resistance lines R1 and the four second resistance lines R2 extends in a curved shape from one end to the other end in the circumferential direction. On the other hand, in the first modification of FIG. 11, four first resistance lines R1 and four second resistance lines R2 extend linearly from one end to the other end in the circumferential direction. Even in such the shape, the resistance values of the four first resistance lines R1 and the four second resistance lines R2 change according to the expansion and contraction of the diaphragm 221 in the circumferential direction. Accordingly, the rotation angle of the rotational motion input to the flex gear 20 can be detected based on the change in the resistance values of the four first resistance lines R1 and the four second resistance lines R2.

As described above, at least one first resistance line R1 of the four first resistance lines R1 may be curved or linear. At least one second resistance line R2 of the four second resistance lines R2 may be curved or linear. Thus, the freedom degree of disposition of the first resistance line R1 and the second resistance line R2 is improved. For example, the first resistance line R1 and the second resistance line R2 can be disposed while avoiding other wirings on the circuit board 41. Alternatively, the first resistance line R1 and the second resistance line R2 can be disposed in consideration of the shape of the flex gear 20. In particular, when the first resistance line R1 and the second resistance line R2 are linear, the resistance line can be easily formed by shortening the length of the resistance line.

FIG. 12 is a plan view illustrating the sensor 40 according to a second modification. In FIG. 12, the third resistance line R3 to sixth resistance line R6 constituting the torque detection sensor S2, the seventh resistance line R7 constituting the temperature detection sensor S3, and the connection lines W1 to W3 are not illustrated.

In the second modification of FIG. 12, the four first resistance lines R1 and the four second resistance lines R2 extend in a polygonal line shape substantially along the circumferential direction between one end and the other end in the circumferential direction. Even in such the shape, the resistance values of the four first resistance lines R1 and the four second resistance lines R2 change according to the expansion and contraction of the diaphragm 221 in the circumferential direction. Accordingly, the rotation angle of the rotational motion input to the flex gear 20 can be detected based on the change in the resistance values of the four first resistance lines R1 and the four second resistance lines R2.

As described above, at least one first resistance line R1 of the four first resistance lines R1 may have a polygonal line shape extending substantially along the circumferential direction. At least one second resistance line R2 of the four second resistance lines R2 may have a polygonal line shape extending substantially along the circumferential direction. Thus, the freedom degree of disposition of the first resistance line R1 and the second resistance line R2 is improved. For example, the first resistance line R1 and the second resistance line R2 can be disposed while avoiding other wirings on the circuit board 41. Alternatively, the first resistance line R1 and the second resistance line R2 can be disposed in consideration of the shape of the flex gear 20. In particular, in the case where the first resistance line R1 and the second resistance line R2 have the polygonal line shape, the detection result more accurately reflecting the expansion and contraction in the circumferential direction than in the case where the first resistance line R1 and the second resistance line R2 have the linear shape can be obtained.

FIG. 13 is a plan view illustrating the sensor 40 according to a third modification. In FIG. 13, the third resistance line R3 to sixth resistance line R6 constituting the torque detection sensor S2, the seventh resistance line R7 constituting the temperature detection sensor S3, and the connection lines W1 to W3 are not illustrated.

In the third modification of FIG. 13, the four first resistance lines R1 and the four second resistance lines R2 extend obliquely with respect to the circumferential direction and the radial direction, respectively. Even in such the shape, the resistance values of the four first resistance lines R1 and the four second resistance lines R2 change according to the expansion and contraction of the diaphragm 221 in the circumferential direction. Accordingly, the rotation angle of the rotational motion input to the flex gear 20 can be detected based on the change in the resistance values of the four first resistance lines R1 and the four second resistance lines R2.

As described above, at least one first resistance line R1 of the four first resistance lines R1 may extend obliquely with respect to the circumferential direction and the radial direction. At least one second resistance line R2 of the four second resistance lines R2 may extend obliquely with respect to the circumferential direction and the radial direction. Thus, the freedom degree of disposition of the first resistance line R1 and the second resistance line R2 is improved. For example, the first resistance line R1 and the second resistance line R2 can be disposed while avoiding other wirings on the circuit board 41. Alternatively, the first resistance line R1 and the second resistance line R2 can be disposed in consideration of the shape of the flex gear 20.

When the first resistance line R1 and the second resistance line R2 are inclined with respect to the circumferential direction, the resistance values of the first resistance line R1 and the second resistance line R2 change according to the torque applied to the flex gear 20. In order to cancel the change in the resistance value caused by the torque, the two first resistance lines Ra, Rc separated by 180° from the central axis 9 in the four first resistance lines Ra to Rd are desirably inclined in opposite directions with respect to the circumferential direction. In the four first resistance lines Ra to Rd, desirably the two first resistance lines Rb, Rd separated by 180° from the central axis 9 are also inclined in the direction opposite to the circumferential direction. However, the directions of the inclinations of the first resistance lines R1 adjacent to each other in the circumferential direction with respect to the circumferential direction may be the same or opposite.

Similarly, in the four second resistance lines Re to Rh, the two second resistance lines Re and Rg separated by 180° from the central axis 9 are desirably inclined in opposite directions with respect to the circumferential direction. In the four second resistance lines Re to Rh, desirably the two second resistance lines Rf, Rh separated by 180° from the central axis 9 are also inclined in opposite directions with respect to the circumferential direction. However, the directions of the inclinations of the second resistance lines R2 adjacent to each other in the circumferential direction with respect to the circumferential direction may be the same or opposite.

FIG. 14 is a plan view illustrating the sensor 40 according to a fourth modification. In FIG. 14, the third resistance line R3 to sixth resistance line R6 constituting the torque detection sensor S2, the seventh resistance line R7 constituting the temperature detection sensor S3, and the connection lines W1 to W3 are not illustrated.

In the example embodiment, each of the four first resistance lines R1 and the four second resistance lines R2 extends in the circumferential direction. This is to detect the periodic deformation of the diaphragm 221 in the circumferential direction. However, when the power transmission device 1 is driven, the diaphragm 221 is periodically deformed not only in the circumferential direction but also in the radial direction. For this reason, as illustrated in FIG. 14, each of the four first resistance lines R1 and the four second resistance lines R2 may extend in the radial direction. Even in this case, the resistance values of the four first resistance lines R1 and the four second resistance lines R2 change according to the expansion and contraction in the radial direction of the diaphragm 221. Accordingly, the rotation angle of the rotational motion input to the flex gear 20 can be detected based on the change in the resistance values of the four first resistance lines R1 and the four second resistance lines R2.

In the example of FIG. 14, each of the plurality of first resistance lines R1 extends linearly along the radial direction from one end to the other end in the radial direction. That is, each of the first resistance lines R1 is constituted of a region of one resistance line along the radial direction. Thus, the region occupied by the first resistance line R1 on the surface of the insulating layer 42 can be reduced as compared with the case where the first resistance line R1 has a plurality of resistance line regions along the radial direction.

Similarly, in the example of FIG. 14, each of the plurality of second resistance lines R2 extends linearly along the radial direction from one end to the other end in the circumferential direction. That is, each of the second resistance lines R2 is constituted of a region of one resistance line along the radial direction. Thus, the region occupied by the second resistance line R2 on the surface of the insulating layer 42 can be reduced as compared with a case where the second resistance line R2 has a plurality of resistance line regions along the radial direction.

In the example embodiment, the number of regions of the resistance line along the circumferential direction is one in each of the four first resistance lines R1. In the example embodiment, the number of regions of the resistance line along the circumferential direction is one in each of the four second resistance lines R2. However, in at least one first resistance line R1 of the four first resistance lines R1, the number of regions of the resistance lines along the radial direction may be one. In at least one second resistance line R2 of the four second resistance lines R2, the number of regions of the resistance lines along the radial direction may be one.

That is, in the at least one first resistance line R1, the number of regions of the resistance line along the circumferential direction may be one or less, and the number of regions of the resistance line along the radial direction may be one or less. Thus, the region occupied by the first resistance line R1 on the surface of the insulating layer 42 can be reduced. In at least one of the second resistance lines R2, the number of regions of the resistance line along the circumferential direction may be one or less, and the number of regions of the resistance line along the radial direction may be one or less. Thus, the region occupied by the second resistance line R2 on the surface of the insulating layer 42 can be reduced.

In the example embodiment, the radial positions of the four first resistance lines R1 are identical to the radial positions of the four second resistance lines R2. However, the radial positions of the four first resistance lines R1 and the radial positions of the four second resistance lines R2 may be different from each other. Thus, the freedom degree of disposition of the first resistance line R1 and the second resistance line R2 is improved. For example, the first resistance line R1 and the second resistance line R2 can be disposed while avoiding other wirings on the circuit board 41. Alternatively, the first resistance line R1 and the second resistance line R2 can be disposed in consideration of the shape of the flex gear 20.

In the example embodiment, the four first resistance lines R1 and the four second resistance lines R2 are arranged at equal intervals in the circumferential direction. However, the four first resistance lines R1 and the four second resistance lines R2 may be disposed at non-uniform intervals in the circumferential direction.

In the example embodiment, the four first resistance lines R1 and four second resistance lines R2 constituting the rotation angle detection sensor S1 are located radially outside the third resistance lines R3 to the sixth resistance lines R6 constituting the torque detection sensor S2. However, the four first resistance lines R1 and four second resistance lines R2 constituting the rotation angle detection sensor S1 may be located radially inside the third resistance lines R3 to the sixth resistance lines R6 constituting the torque detection sensor S2.

In the example embodiment, the four first resistance lines R1 and four second resistance lines R2 constituting the rotation angle detection sensor S1 and the third resistance lines R3 to sixth resistance lines R6 constituting the torque detection sensor S2 are disposed on the same surface of the insulating layer 42. However, the four first resistance lines R1 and four second resistance lines R2 constituting the rotation angle detection sensor S1, and the third resistance lines R3 to sixth resistance lines R6 constituting the torque detection sensor S2 may be disposed on different surfaces of the insulating layer 42. In this case, the first conductor layer 43 and the second conductor layer 44 may be formed on both surfaces of the insulating layer 42.

The sensor 40 of the example embodiment includes the four first resistance lines R1 and the four second resistance lines R2. However, the number of each of the first resistance lines R1 and the second resistance lines R2 included in the sensor 40 may be other than four.

In the example embodiment, the first resistance line R1 and the second resistance line R2 are disposed on the surface of the insulating layer 42 of the circuit board 41. However, the first resistance line R1 and the second resistance line R2 may be disposed on the surface 223 of the diaphragm 221. For example, the insulating film is formed on the surface 223 of the diaphragm 221, and the conductor layer is formed on the surface of the insulating film by sputtering or the like. Then, an unnecessary portion of the conductor layer may be removed by scientific means such as etching or physical means such as a laser beam. In this case, the insulating film formed on the surface 223 of the diaphragm 221 is the "base" in the present disclosure. For example, an inorganic insulating material is used for the insulating film.

Furthermore, the sensor 40 may include a sensor other than the rotation angle detection sensor S1, the torque detection sensor S2, and the temperature detection sensor S3. For example, the sensor 40 may include a sensor detecting axial strain of the flex gear 20.

In the example embodiment, the torque detection sensor S2 includes the four resistance lines of the third resistance line R3 to the sixth resistance line R6. The third bridge circuit C3 is a full bridge circuit including four resistance lines of the third resistance line R3 to the sixth resistance line R6. However, the torque detection sensor S2 may include only two resistance lines. In this case, the third bridge circuit C3 may be a half bridge circuit including the two resistance lines and two fixed resistors.

In the example embodiment, the signal processing circuit C0 is mounted on the circuit board 41. However, the signal processing circuit C0 may be provided outside the circuit board 41.

In the flex gear 20 of the example embodiment, the diaphragm 221 expands radially outward from the axial end of the cylindrical portion 21. However, the diaphragm 221 may expand radially inward from the axial end of the cylindrical portion 21.

In the example embodiment, the detection target of the sensor 40 is the flex gear 20. However, the detection target of the sensor 40 is not limited to the flex gear 20. The sensor 40 having a structure equivalent to that of the example embodiment may be used to detect the rotation angle of the rotational motion input to a flexible assembly other than the flex gear 20.

In addition, detailed configurations of the sensor and the power transmission device may be appropriately changed without departing from the gist of the present disclosure. In addition, the elements that appear in the example embodiment and the modification may also be appropriately combined in a range in which there is no contradiction.

The present application can be applied to, for example, the sensor and the power transmission device.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A sensor comprising:
    a base extending in a direction intersecting with a central axis;
    first resistance lines arrayed in a circumferential direction on a surface of the base; and
    second resistance lines arranged concentrically with the first resistance lines and between the first resistance lines in the circumferential direction on the surface of the base; wherein
    in at least one of the first resistance lines, a number of regions of the resistance line along the circumferential direction is one or less, and a number of regions of the resistance line along a radial direction is one or less; and
    the base includes a rotation angle detection sensor to detect a rotation angle of rotational motion.

2. The sensor according to claim 1, wherein in at least one of the second resistance lines, a number of regions of the resistance line along the circumferential direction is one or less, and a number of regions of the resistance line along the radial direction is one or less.

3. The sensor according to claim 1, wherein
    at least one of the first resistance lines extends in a straight line, a curved line, or a polygonal line; and
    at least one of the second resistance lines extends in a straight line, a curved line, or a polygonal line.

4. The sensor according to claim 1, wherein
    each of the first resistance lines extends obliquely with respect to the circumferential direction and the radial direction; and
    each of the second resistance lines extends obliquely with respect to the circumferential direction and the radial direction.

5. The sensor according to claim 1, wherein
    the base is an insulating layer, and includes:
    a first conductor layer on a surface of the insulating layer; and
    a second conductor layer laminated on a surface of the first conductor layer;
    each of the first resistance lines and each of the second resistance lines are defined by the first conductor layer; and
    a connection line extending from ends of the first resistance lines and the second resistance lines is defined by the first conductor layer and the second conductor layer.

6. The sensor according to claim 5, wherein a specific resistance of a material of the second conductor layer is lower than a specific resistance of a material of the first conductor layer.

7. The sensor according to claim 5, wherein a gauge factor of a material of the second conductor layer is lower than a gauge factor of a material of the first conductor layer.

8. The sensor according to claim 5, wherein
    a material of the first conductor layer is a material containing copper or a material containing chromium; and
    a material of the second conductor layer is copper, silver, or gold.

9. The sensor according to claim 5, wherein a line width of at least a portion of the connection line is wider than a line width of the first resistance line and a line width of the second resistance line.

10. The sensor according to claim 1, wherein
    each of the first resistance lines has an arc shape extending along the circumferential direction from one end to another end in the circumferential direction; and
    each of the second resistance lines has an arc shape extending along the circumferential direction from the one end to the other end in the circumferential direction.

11. The sensor according to claim 1, wherein a radial position of each of the second resistance lines is different from a radial position of each of the first resistance lines.

12. The sensor according to claim 1, wherein
    the first resistance lines include a total of four first resistance lines; and
    the second resistance lines include a total of four second resistance lines; wherein
    a circumferential central portion of the first resistance lines and a circumferential central portion of the second resistance lines are alternately arranged at intervals of 45° around the central axis.

13. The sensor according to claim 12, further comprising a detection circuit including the first resistance lines and the second resistance lines.

14. The sensor according to claim 13, wherein
    the detection circuit includes:
    a first bridge circuit including the four first resistance lines; and
    a second bridge circuit including the four second resistance lines.

15. The sensor according to claim 13, wherein
    the base is on a surface of a flexurally deformable flexible assembly that extends in a direction intersecting with the central axis; and the base includes:
a torque detection sensor to detect torque applied to the flexible assembly; and
the rotation angle of rotational motion is input to the flexible assembly by the detection circuit.

16. The sensor according to claim 15, further comprising a signal processing circuit to correct a measurement value of the torque detection sensor based on the rotation angle detected by the rotation angle detection sensor.

17. The sensor according to claim 15, wherein an additional resistance line defining the torque detection sensor, the first resistance lines, and the second resistance lines are located on a same surface of the base.

18. The sensor according to claim 17, wherein the first resistance lines and the second resistance lines are located radially outside the resistance line of the torque detection sensor.

19. The sensor according to claim 15, further comprising a temperature detection sensor to detect a temperature of the flexible assembly by an additional resistance line extending in an arc shape around the central axis.

20. A power transmission device comprising:
the sensor according to claim 15; and
the flexible assembly; wherein
the flexible assembly includes:
a flexible cylindrical portion extending in a cylindrical shape in an axial direction;
a plurality of external teeth provided on a radially outer surface of the cylindrical portion; and
a diaphragm expanding radially outward or radially inward from an axial end of the cylindrical portion; and
the base is located on a surface of the diaphragm.

* * * * *